(12) United States Patent
Mitchem et al.

(10) Patent No.: US 6,804,245 B2
(45) Date of Patent: *Oct. 12, 2004

(54) COMPACT, SHARED ROUTE LOOKUP TABLE FOR A FIBER CHANNEL SWITCH

(75) Inventors: William J. Mitchem, Westminster, CO (US); Jeffrey J. Nelson, Louisville, CO (US)

(73) Assignee: McData Corporation, Broomfield, CO (US)

( * ) Notice: Subject to any disclaimer, the term of this patent is extended or adjusted under 35 U.S.C. 154(b) by 165 days.

This patent is subject to a terminal disclaimer.

(21) Appl. No.: 09/932,349

(22) Filed: Aug. 17, 2001

(65) Prior Publication Data

US 2003/0043834 A1 Mar. 6, 2003

(51) Int. Cl.[7] .......................... H04L 12/54; H04L 12/28
(52) U.S. Cl. .................. 370/395.31; 370/397; 370/423; 370/428; 370/401
(58) Field of Search ................................. 370/229, 231, 370/235, 237, 355, 357, 359, 386, 387, 397, 401, 423, 395.31, 419, 428, 392, 395.3, 395.71, 395.72, 389, 400; 710/33, 36, 38, 126; 709/230, 203

(56) References Cited

U.S. PATENT DOCUMENTS

| | | | |
|---|---|---|---|
| 5,689,644 A | | 11/1997 | Chou et al. |
| 5,757,799 A | * | 5/1998 | LaRue ........................ 370/423 |
| 6,138,185 A | * | 10/2000 | Nelson et al. ................ 710/33 |
| 6,192,048 B1 | | 2/2001 | Nelson et al. .............. 370/380 |
| 6,553,031 B1 | * | 4/2003 | Nakamura et al. .......... 370/392 |
| 6,606,322 B2 | * | 8/2003 | Mitchem et al. ....... 370/395.31 |
| 2002/0032787 A1 | * | 3/2002 | Overton et al. ............. 709/230 |

OTHER PUBLICATIONS

American National Standard for Information Systems, "Fibre Channel Fabric Generic Requirements (FC–FG) Rev. 3.5".

* cited by examiner

Primary Examiner—Afsar Qureshi
(74) Attorney, Agent, or Firm—Stuart T. Langley, Esq.; Carol W. Burton Esq.; Hogan & Hartson L.L.P.

(57) ABSTRACT

A central route table design in a fiber channel switch for providing one location for D_ID and exit port combinations. The fiber channel switch has a plurality of ports, each are coupled to the central route look-up table.

17 Claims, 8 Drawing Sheets

COMPACT, SHARED ROUTE LOOKUP TABLE FOR A FIBER CHANNEL SWITCH

BACKGROUND OF THE INVENTION

The present invention relates, in general, to the field of fibre channel switching technology. More particularly, the present invention relates to a route caching scheme for a receive port in a fibre channel switch.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections between ports. A fabric is a network of switches for interconnecting a plurality of devices without restriction as to the manner in which the switch can be arranged. A fabric can include a mixture of point-to-point and arbitrated loop topologies.

In Fibre Channel, a channel is established between two nodes where the channel's primary task is to transport data from one point to another at high speed with low latency. The Fibre channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

In a fibre channel switching environment, a module within the switching element determines the appropriate route for incoming frames based upon a particular destination ID value (D_ID) located within the frame header. The D_ID identifies the exit port associated with the incoming frame. In most applications, a route lookup table provides the translation from the D_ID to the appropriate exit port.

In prior approaches, the switch dedicates a unique route lookup table to each port. Since such route lookup tables must necessarily be large to accommodate all the possible associations between the incoming frame D_ID's and the corresponding exit ports, this approach requires a significant amount of memory.

SUMMARY OF THE INVENTION

The shared route lookup table design of the present invention provides a solution to the aforementioned problem, which is vastly superior to anything currently available. It not only provides a shared location for D_ID and exit port combinations, but it does so in an extremely efficient manner without requiring any significant design changes and with only a relatively straightforward alteration to existing processes for networking in a fibre channel switching environment.

Particularly disclosed herein is a method for routing a data frame through a fibre channel fabric. The fabric has a first switch with a plurality of ports. The ports are operative for transmitting and receiving the data frame. First a central route table is provided that is coupled to each of said plurality of ports. A data frame is received at a first port. The destination information is then extracted from the data frame. The destination information is then sent from the first port to the central route table. An association from the central route table is retrieved having an identification of a second port associated with the destination information. Finally, the association is sent from the central route table to the first port.

In another aspect, the present invention provides a fibre channel fabric having a plurality of switches. Each switch has a plurality of ports for transmitting and receiving data frames. Also provided is a control route table coupled to each of the plurality of fibre channel ports. The control route table is operative for providing a single routing table to the plurality of ports, which provides association data. The association data is the association between a destination identification and a corresponding exit port.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
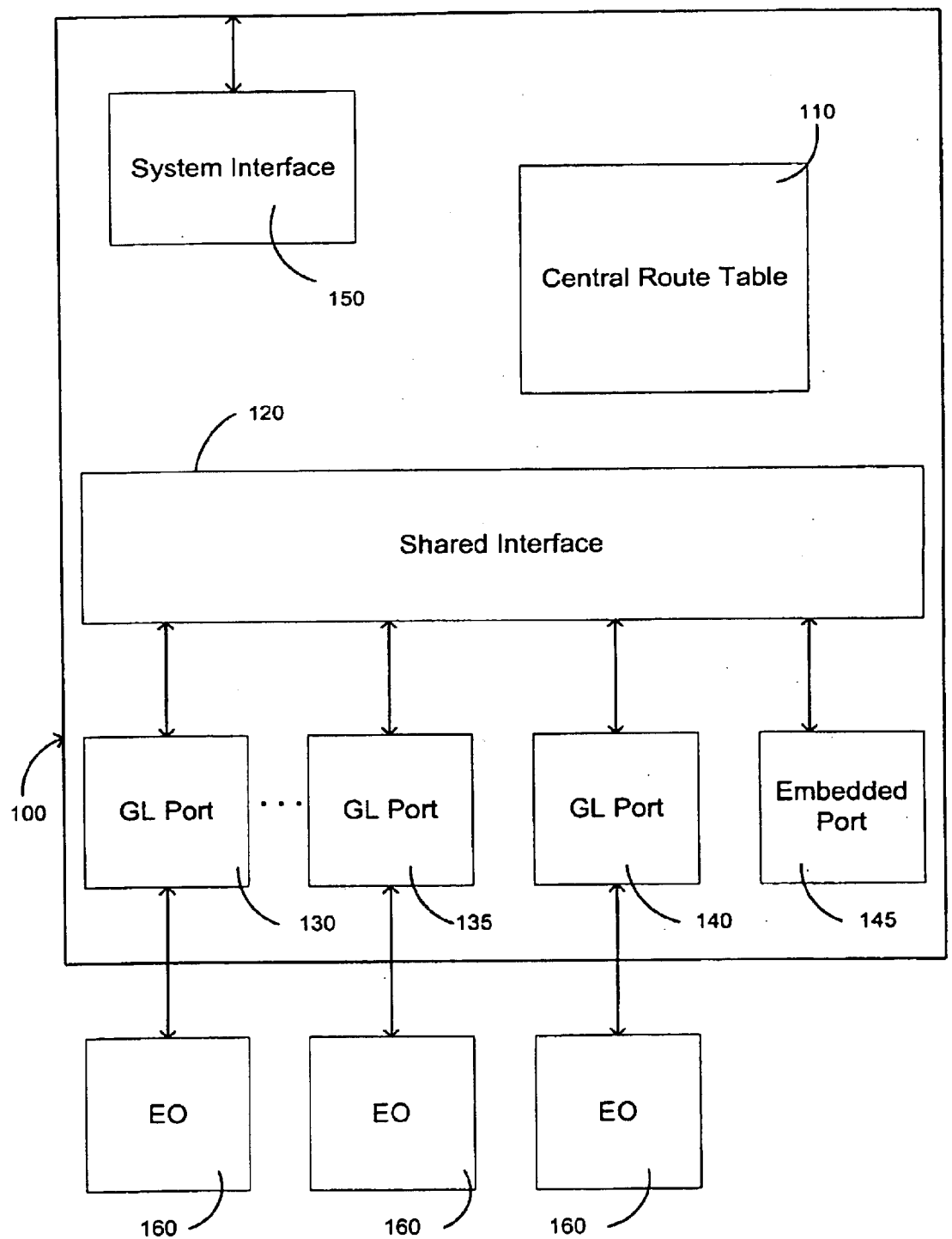
FIG. 1 is a block diagram of a switching element, wherein the switching element has a shared memory, a central route table and a plurality of fibre channel ports.

FIG. 1 shows a generalized block diagram of a fibre channel switch for use in a fibre channel fabric implementing the method and systems of the present invention. In one embodiment, the fibre channel switching element 100 of FIG. 1 may be implemented on a single application specific integrated circuit (ASIC). However, there are many implementations of switch 100 not shown, such as frame buffer memory could be located in each GL_Port in which case shared memory is replicated with a crossbar switch.

The fibre channel fabric associated with switch 100 is the method for connecting the various N-Ports of the devices together. In this way, the fabric is capable of routing fibre channel frames using only the destination identification information in the fibre channel frame header. The destination identification information identifies which N-Port receives the frame.

Fibre channel switch 100 has a plurality of ports for receiving and transferring data through the switch. In FIG. 1, the ports are illustrated as GL-ports 130, 135 and 140. In one embodiment, switch 100 comprises 24 GL_Port modules. Each GL_Port is coupled to shared memory 120 and external optical interface 160. External optical interface couples switch 100 to the N-Port, NL-Port or E-Port of the device coupled to the fibre channel fabric. Fibre channel switch 100 is associated with a central route table 110. Central route table 110 is operatively coupled to each GL-Port associated with fibre channel switch 100 (not shown in FIG. 1). Switch 100 also has a system interface 150. System interface module 150 provides interfaces to the power supply, fans, temperature sensor, LED's, and the serial interfaces of the optical transceivers.

Continuing, fibre channel switch 100 has an embedded port 145 in addition to illustrated GL_Ports 130, 135 and 140. Within the context of the invention, embedded port 145 may be used for several functions. First, it may provide a system services processor an access point for all of the fibre channel well-known addresses for both the reception and transmission of frames. Secondly, it may handle any fibre channel frame that cannot be delivered to a destination for either busy, reject, or timeout conditions. It may also be responsible for the generation, modification and/or interpretation of all Fibre Channel-Arbitrated Loop (FC-AL) initialization frames (such as LIFA, LIPA, LIHA, and LISA frames) for the GL-Ports operating in fabric loop mode. The embedded port interface is slightly different than that of an actual GL_Port module. Since the Fibre Channel-0/1 layers are not required, embedded port 145 does not implement the low-level interface for either primitive signaling or sequences. After the system services processor has completed initialization of embedded port 145, it enters and remains in the fibre channel active state.

Embedded port 145 provides a register set accessible to the system services processor for basic initialization and low level control. Once enabled, embedded port 145 is responsible for all functions related to the transmission and reception of frames to and from shared memory 120. For data path consistency within the following description, the direction of fibre channel frame flow is referenced to shared memory 120. Thus, a transmit (TX) path actually contains paths destined to, or received by, the embedded port from shared memory 120 and a receive (RX) path contains frames generated or transmitted by embedded port 145.

Embedded port 145 creates and consumes buffers that contain complete fibre channel frames. Frames may be held in SRAM coupled to embedded port 145. SRAM will typically hold two frames, one TX frame received from shared memory 120 and one RX frame waiting to be moved into shared memory 120. All other TX frames waiting to be read by embedded port 145 and RX frames previously created by embedded port 145 are stored in shared memory buffers. In one embodiment, embedded port 145 may be allocated up to 12 shared memory buffers for storage of RX frames. Typically, TX frames utilize the shared memory buffers allocated to the GL-Ports that receive the fibre channel frames.

For example, for fast turn-around of Arbitrated Loop address initialization frames, a TX frame may be modified in place in the embedded port SRAM by software and sent via an RX path without the need to move the frame. One of the shared memory buffers allocated to an embedded port may be designated as a protected buffer. The protected buffer can be filled with an RX frame that is transmitted frequently and left intact so that the frame can be sent to an exit port without the time delay of moving the frame from the extended port SRAM to the shared memory buffer.

An embedded port receiver (RX) is used to transfer frames from a system services processor to other ports in the switch 100. The Receiver module will be identical to the GL_Port RX module described hereinafter. Similarly, an embedded port transmitter (TX) is used to transfer frames from other ports via shared memory to a system services processor. The Transmitter module will be identical to the GL_Port TX module also described hereinafter. An Embedded Port Front End is used to transfer data between the Embedded Port SRAM and the TX and RX modules.

Shared memory 120 provides buffering and switching for all fibre channel frames that flow through switch 100. Received frames are written to shared memory 120 by the receiving port then read from shared memory 120 by the transmitting port. In one embodiment, shared memory 120 has 162 total frame locations shared by the GL-Ports 130, 135 and 140 and embedded port 145. In such an example, each port may be allocated as many as 12 buffers, so long as the total of 162 buffers is not exceeded.

Central Route Control module 110 provides a common route table for all ports in switch 100. Route table provides a translation from each possible Destination ID (D_ID) value to the appropriate exit port. Additionally, the route table provides for hard zoning, which is the capability for blocking traffic from certain receive ports to certain D_IDs. Each port uses an exit port request and response bus to communicate with central route table 110.

GL_Ports 130, 135 and 140 transmit and receive fibre channel frames to and from the switch and to and from the fibre channel fabric. As shown in FIG. 1, each GL_Port is coupled to an external optical interface 160 that in turn couples the port to the fabric and ultimately to the N_Port of the destination device.

GL_Ports may function as an E_Port, an F_Port or an FL_Port, to name a few. An E_Port is an expansion port that serves as a physical interface within the fabric that is used to create multi-switch fabrics by attaching another switches E_Port through an interswitch link (ISL). An F_Port is a fabric port that operates as a physical interface within the fabric that attaches to an N_Port of a destination device through a point-to-point link connection. An FL_Port is a fabric loop port that contains arbitrated loop (AL) functions associated with the FC-AL topology. FC-AL is a fibre channel topology where ports use arbitration to establish a point-to-point circuit.

Figure 2:
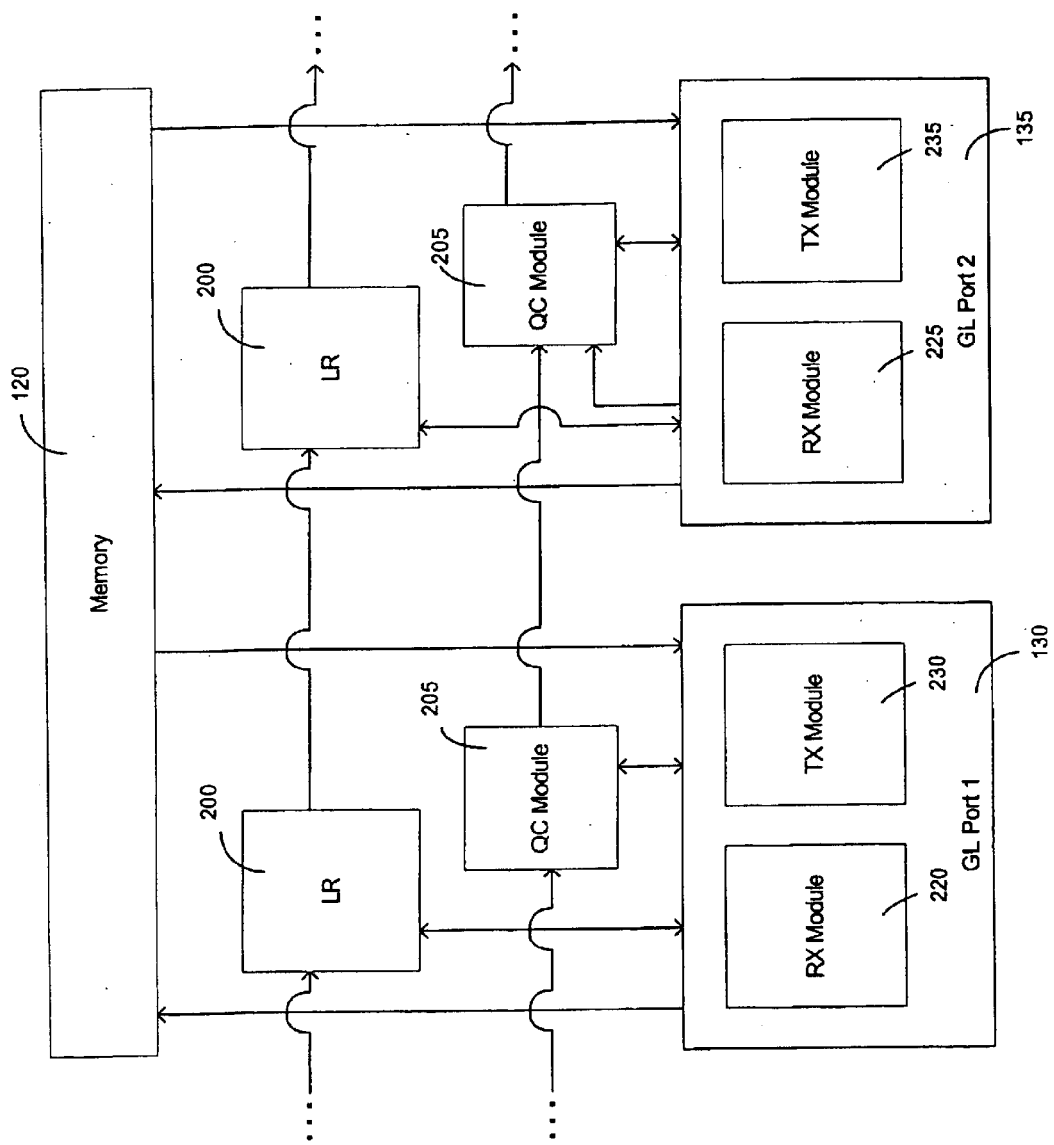
FIG. 2 is a detailed block diagram illustrating one embodiment of an interrelationship between modules of the switching element, particularly the fibre channel ports, local control route module, shared memory, and QC module.

FIG. 2 illustrates one possible method of connecting GL_Ports 130 and 135, as well as possible connections between the ports and shared memory 120 and local control route module 200. GL_Port 130 has a TX module 230 and an RX module 220 for sending and receiving frames. GL_Port 135 also has a TX module 235 and RX module 225. For example, if GL_Port 130 is the receiving port for a data frame and GL_Port 135 is the exit port for the data frame, the frame would first be sent from RX module 220 to shared memory 120 and then sent from shared memory 120 to TX module 235 as illustrated.

Continuing with the illustrated example of FIG. 2, RX port module of GL_Port 130 is coupled to TX port module of GL_Port 135 through a QC module 205. QC Control Module 205 acts as the control interface between the TX module 235 and RX module 220. QC Control Module 205 routes both a request and an acknowledgement signals between GL_Ports that serve to transmit exit port information and location of the fibre channel frame in shared memory from RX module 220 as well as return a successful frame transmission message from TX module 235.

Local route control module (LR) 200 is used by the GL_Port RX module to request the exit port for a frame based on the frame's destination ID value (D_ID). As shown in FIG. 2, a send and receive connection couples RX module 220 of GL_Port 130 with LR 200. The connection allows RX module 220 to request an exit port from the local control route module 200 and also for LR 200 to transmit the identity of the exit port back to RX module 220.

Figure 2A:
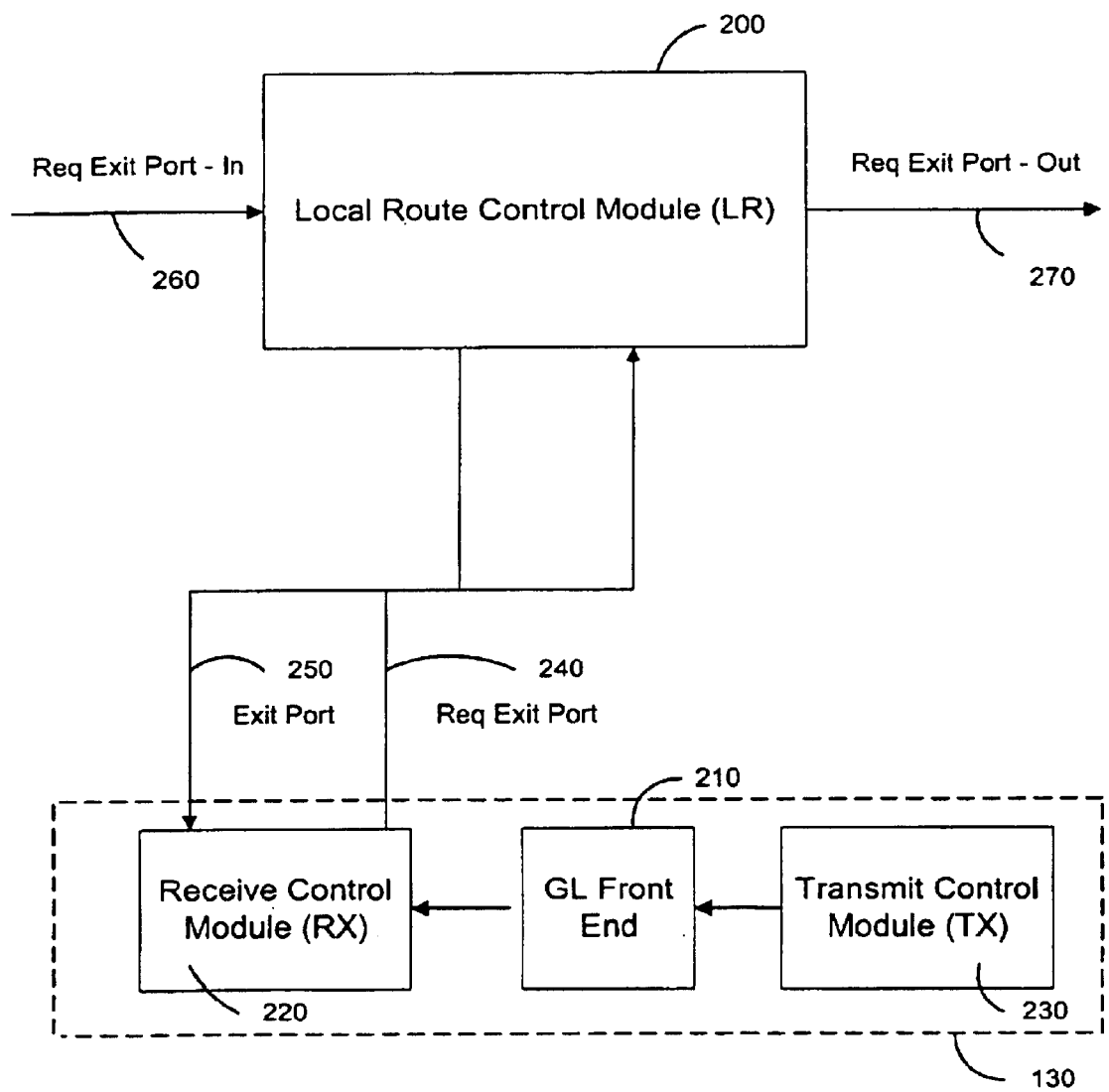
FIG. 2A is a block diagram illustrating a typical interface between a fibre channel port and a local route control module.

FIG. 2A illustrates the communication between GL_Port 130 and local route control module 200 in greater detail. TX control module 230 and RX control module 220 are coupled through fibre channel front end module 210. Fibre channel front end (FE) 210 provides the FC-0/1 level processing requirements. FE 210 includes all of the character level state machines required to support a fibre channel link, including all of the requirements for normal data frame processing. FE 210 provides an interface to the system services processor for low level control over the fibre channel link interface.

For the processing of frame traffic, FE 210 provides independent, symmetrical RX and TX interfaces to carry frame data. These paths consist of a data bus and control signals that identify the beginning and ending frame delimiters. For the RX path, status information about the frame including CRC validation, truncated frames and other pertinent status is also included as part of the signal.

Fibre channel front end 210 continuously monitors its receive link for the detection of a start of file (SOF) delimiter in the fibre channel frame. When an SOF is detected, FE 210 then forwards the frame to the RX module 220. RX module 220 stores the frame into the next available shared memory buffer. RX module 220 uses LR 200 to make a destination port routing decision from the header information of the received frame. RX module 220 then combines the shared memory buffer number into a field, which may be referred to as a Qentry field, which is passed to a TX module of the destination port through QC Module 205. RX module 220 then waits for the TX module to return the buffer number via an AckQEntry field. When RX module 220 receives the AckQEntry field it indicates to FE 210 that the buffer is being consumed.

The time that is required for all this processing is less than 1 microsecond. For this example it is most likely that RX module 220 is still storing the received frame while the TX module is transmitting the same frame, creating a cut-through switching effect. If the TX did not immediately transmit the frame, it is possible that the entire frame has been written into the buffer memory when transmission commenced, providing for a store and forward type of switching function.

The TX logic continuously monitors the bus coupling QC Controller 205 with TX module 230 for QEntries. When a QEntry is received, it is placed in TX module 230. When FE 210 is able to transmit a new frame, the queue selects a QEntry for processing. The shared memory buffer number for the frame to transmit is extracted from the QEntry and the TX module initiates a shared memory read operation. The frame data is then passed from the shared memory 120 to the FE 210. FE 210 transmits the frame.

Continuing with FIG. 2A, RX module 220 of port 130 is coupled to LR module 200 so as to request and receive exit port information. In one possible example, RX module 220 requests the identity of an exit port for a particular frame by sending a request over ReqExitPort connection 240 to LR 200. LR module 200 performs the necessary procedure for retrieving the exit port identity based on the transmitted D_ID. LR module 200 then transmits the generated exit port information to RX module 220 over ExitPort connection 250.

Figure 3:
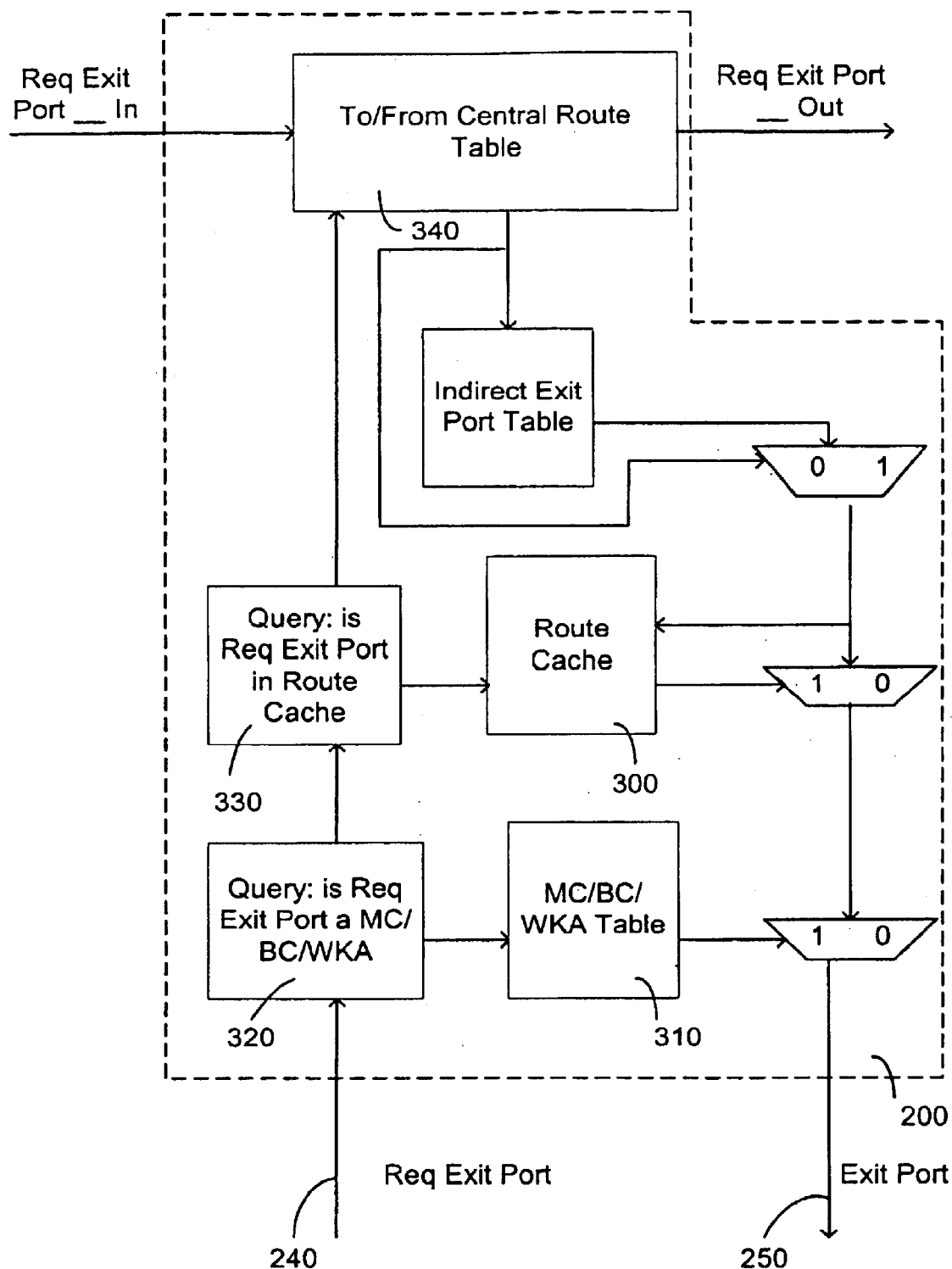
FIG. 3 is a detailed block diagram of a local route control module.
Figure 4:
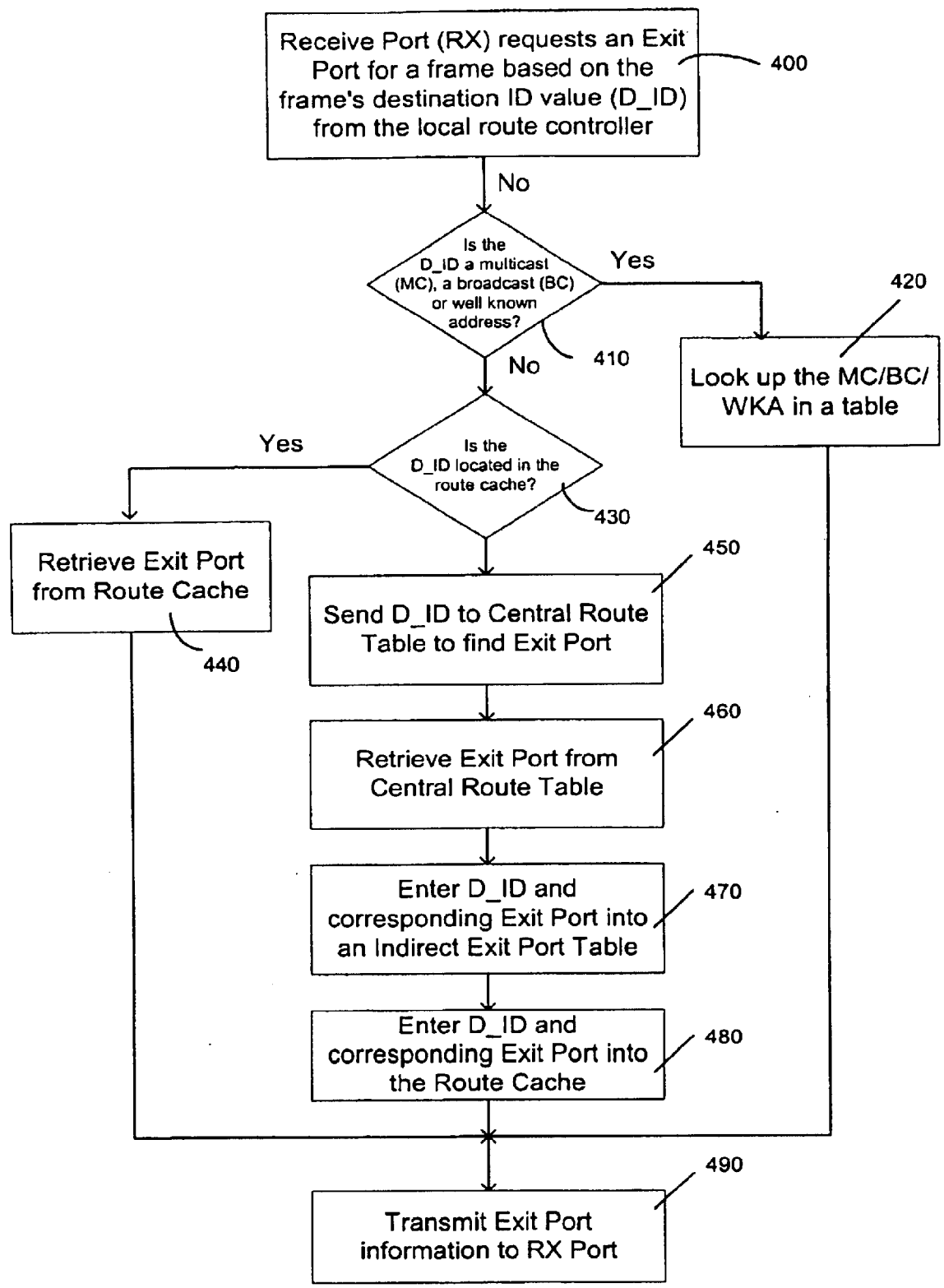
FIG. 4 is a flow chart for a data cache operation.

FIGS. 3 and 4 illustrate the operation of local route control module 200 in greater detail. Local route control module 200 is used by GL_Port RX module 220 to request an exit port for a fibre channel frame based on the frame's destination ID value (D_ID). In the illustrated example, the request for an exit port comes in on the ReqExitPort bus 240 to local route control 200.

RX module requests an exit port by providing a D_ID from the frame header to local route control module 200 (step 400). In one embodiment, the D_ID has 24 bits, starting with the 0 bit, which is represented by a designation [23:0]. The first operation 320 of local route control module 200 is to determine if the D_ID identifies a multicast (MC), a broadcast (BC) or a well known address (WKA) (step 410). Multicast and broadcast addresses are directed to a MC/BC/WKA table 310 to identify the exit port. Well-Known Addresses and FC-AL Loop Initialization addresses always result in the Embedded Port being selected as the Exit Port. Domain controller identifier addresses are sent to the central route table for exit port lookup unless a bit is set and the frame is not a class F frame, in which case the Embedded port is selected as the exit port.

If central route table 110 has not yet been initialized, then all frames are routed to the embedded port. All other D_ID values are forwarded to central route table 110. However, prior to forwarding a request for an exit port to central route table 110, LR 200 performs an operation 330 to determine whether an association between the requested D_ID and an exit port designation is found in route cache 300 (step 430). If the D_ID to exit port association is found in route cache 300, the exit port is available immediately. Route cache 300 improves latency by caching the most recent exit port lookups. In one embodiment, the sixteen most recent lookups are stored in cache 300. Cache 300 should be cleared when either the central route table 110 or indirect exit port table 350 is modified.

If the D_ID is not located in route cache 300, then local route controller 200 performs an operation 340 to send the D_ID to a central route table 110. Central route table 110 retrieves the D_ID to exit port association and returns it to local route controller 200. If applicable, the D_ID to exit port association is stored in an indirect exit port table 350 (step 470). As shown in step 480, D_ID to exit port association is stored in route cache 300. In the illustrated example, D_ID to exit port association is sent to RX module over ExitPort bus 250 (step 490).

Figure 4A:
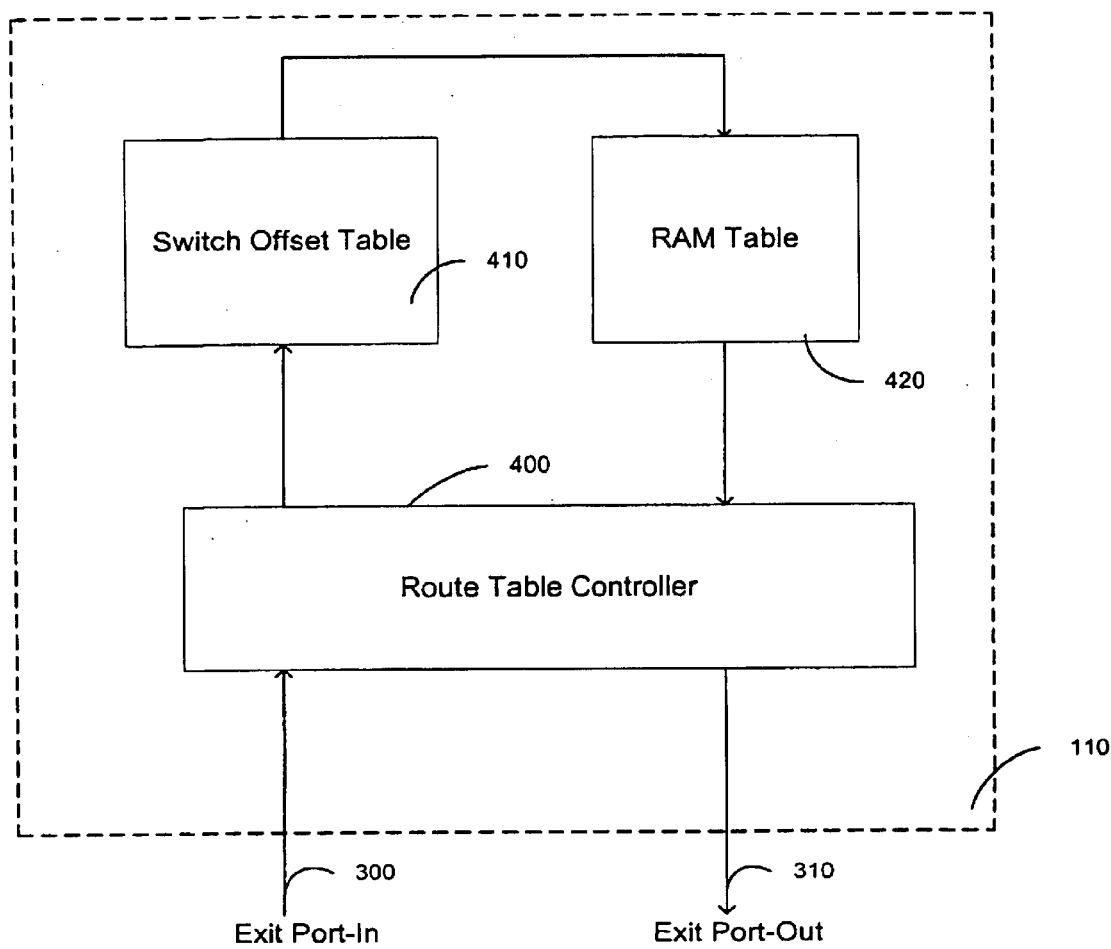
FIG. 4A is a detailed block diagram of the central route table.

FIG. 4A illustrates central route table 110 in greater detail. Central route control module 400 coupled to switch offset table 410 and random access memory table 420 operating in combination provides a common route table for all ports in a switch. Route table 110 provides a translation from a destination identification (D_ID) value to the appropriate exit port. Additionally, the Route Table provides hard zoning, which is the capability for blocking traffic from certain receive ports to certain D_IDs. Each port uses the Exit Port Request and Response busses 300 and 310 to communicate with the central route controller 400.

In one embodiment, route table 110 uses a two-stage lookup to provide support for a fabric with up to 239 switches and 8192 ports. The first stage is shown as switch offset table 410, which uses 8 bits from the D_ID as the switch identifier to select the offset into the second stage. Switch offset table 410 entry contains the following entries: a valid bit V, which is set to 1 to indicate that the entry is valid; the offset into the second stage table, for example OFFSET[12:0], which points to the first entry in the second stage table that corresponds to the switch identified by this entry; the number of ports in the switch, N[7:0], which is used for error checking; and the port number of the first port on the switch, F[3:0].

The second stage is the RAM Table 420, which gets its address from the switch port number given by 8 bits of the D_ID along with the outputs of the switch offset table 410 in the formula:

address=$D\_ID[15:8]$+OFFSET$[12:0]$-$F[3:0]$ when $D\_ID[23:8]$!= 0x$FFFC$ else address=$D\_ID[7:0]$+OFFSET$[12:0]$-$F[3:0]$ when $D\_ID[23:8]$==0x$FFFC$ RAM table 420 contains the lookup table entries for every D_ID value. Each lookup table entry contains: a valid bit V, which is set to 1 to indicate that the entry is valid; 24 Hard Zone Enable bits, RX_PORT_B[23:0], each of which should be set to '1' when the corresponding GL_Port is allowed to access the D_ID; an indirect mapping enable bit, INDIRECT, which causes a third stage of lookup to take place in each port's local route control module, which allows multiple ports to use different inter-element links to reach the same D_ID; and the exit port identifier, TX_PORT [4:0], which if the INDIRECT bit is set, TX_PORT[3:0] is used as the address for the indirect exit port table in the local route controller.

Figure 4B:
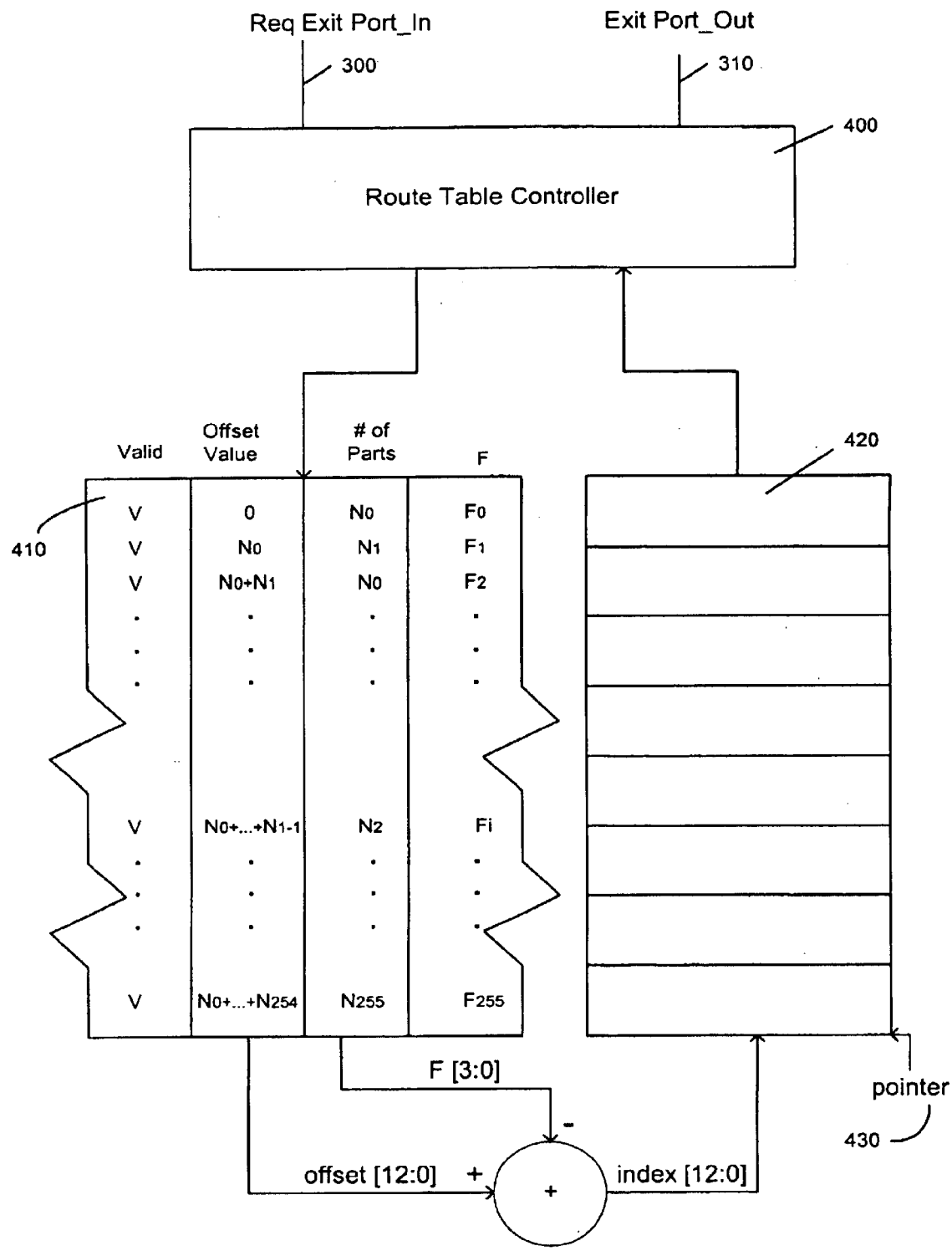
FIG. 4B is a detailed block diagram of the route table controller, offset table and random access memory table of the central route table.

FIG. 4B illustrates the interaction among route table controller 400, first table 410 and second table 420 in greater detail. The request for an exit port identification enters route table controller 400 over bus 300. The information in the header may take the form:

V |RxPort[4:0]|D_ID[23:0]

where V is the valid bit, RxPort is the identification of the receive port requesting an exit port and D_ID is the identification of a destination location.

In one embodiment, route table controller 400 strips off bits from the D_ID that identifies the switch. The switch identifier is then used to select a switch offset value from first table 410 to be used in second table 420. In practice, the offset value is the number of ports of the previous switches in table 410 added together. Switch offset value is used to position pointer 430 at the first entry in second table 420 that corresponds to the switch identified by the offset value.

The output from switch output table 410 is then added back to the switch port number given by the D_ID to generate an index into second table 420, which is basically an address into the second table. Second table 420 uses the address to generate a response to the receive port in the form:

V|RX_Port_B[24:0]|INDIRECT|Tx_Port[4:0]

Rx_Port_B identifies a hard zoning condition. The INDIRECT bit indicates whether the exit port is found in an indirect exit port table. Tx_Port is the identification of the exit port. The response is sent to route table controller 400 to be sent to the receive port over bus 310.

Figure 5:
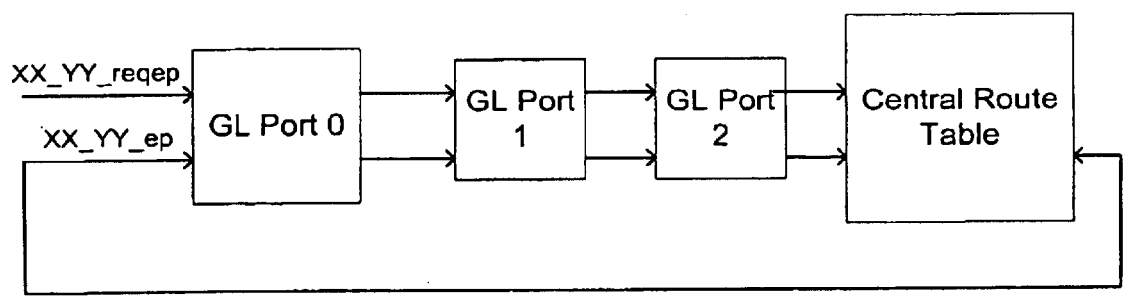
FIG. 5 is a block diagram of the request exit port bus and the exit port response bus.

FIG. 5 illustrates the structure of a request exit port bus ring structure. The request exit port bus is used by the receive controller of a GL_Port to request an exit port number for a given D_ID from the central route controller. The request exit port bus is designed to operate in a ring structure in which each module that is attached to the request exit port bus pipelines and re-powers the request exit port bus signals before sending them to the next module in the ring. The local route control module is used to provide the attachment to the request exit port bus for each module. The request exit port bus signals are described in Table 1.

TABLE 1

Request Exit Port Bus Signal Descriptors

| Signal | Bits | Description |
| --- | --- | --- |
| xx_yy_reqep_v | 1 | Valid bit. Set to '1' for 1 period when xx_yy_reqep_* signals are valid. A module may insert its request for an exit port on the bus when it detects that this bit is '0', indicating an empty time slot. |
| xx_yy_reqep_rxport | 5 | Receive Port Number. Indicates which receiver port is requesting an exit port. |
| xx_yy_reqep_d_id | 24 | Frame destination ID field (D_ID). |
| xx_yy_reqep_bid | 2 | Buffer Identifier. Used to guarantee in-order delivery of exit port information. |
| xx_yy_reqep_p | 1 | Odd Parity. A parity error is reported as a rare event and the request is disgarded. |

FIG. 5 also illustrates the exit port response bus ring. The exit port response bus is used by the central route controller to return an exit port number to an RX module of a GL_Port. The exit port response bus is designed to operate in a ring structure in which each module that is attached to the exit port response bus pipelines and re-powers the exit port response bus signals before sending them to the next module in the ring.

The central route controller may insert an exit port response on the bus in any clock cycle. A local route control module will extract the exit port response from the bus if it is addressed to that GL_Port. The local route control module is used to provide the attachment to the exit port response bus for each module. The exit port response bus signals are described in Table 2.

TABLE 2

Exit Port Response Bus Signal Descriptors

| Signal | Bits | Description |
| --- | --- | --- |
| xx_yy_ep_v | 1 | Valid bit. Set to '1' for 1 period when all xx_yy_ep_* signals are valid. Always set to '1' by the central route control module. Cleared to '0' by the GL_Port, addressed by xx_yy_ep_rxport, that receives the exit port information. |
| xx_yy_ep_err | 2 | Error Status. 00: OK, 01: Parity Err, 10: Bad D_ID, 11: Zone Blocked. |
| xx_yy_ep_rxport | 5 | Receive Port Number. Indicates which receive port that the exit port information is destined for. |
| xx_yy_ep_indirect | 1 | Indirect Lookup Required Bit. When set to '1' the Indirect Lookup Table, addressed by xx_yy_ep_txport [3:0], must be used for determining the exit port. |
| xx_yy_ep_txport | 5 | Transmit Port. Identifies the exit port to which a frame must be sent. xx_yy_ep_txport [3:0] addressed the Indirect Lookup Table when the indirect bit is set to '1'. |
| xx_yy_ep_bid | 2 | Buffer Identifier. Used to guarantee in-order delivery of exit port information. |

TABLE 2-continued

Exit Port Response Bus Signal Descriptors

| Signal | Bits | Description |
|---|---|---|
| xx_yy_ep_p | 1 | Odd Parity. A parity error is reported as a rare event and the exit port information is disgarded. |

While there have been described above the principles of the present invention in conjunction with a specific embodiment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein.

Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for routing a data frame through a fibre channel fabric, said fabric comprising a first switch having a plurality of ports, said ports are operative for transmitting and receiving said data frame, said method comprising:

providing a central route table coupled to each of said plurality of ports;

receiving a data frame at a first port;

extracting the destination information from said data frame;

transmitting said destination information from said first port to said central route table;

retrieving an association from said central route table, said association comprising an identification of a second port associated with said destination information wherein said retrieving step further comprises querying a first table for a first index value associated with said identification data and querying a second table, using the first index value, for the identification of the second port associated with said identification data; and transmitting said association from said central route table to said first port.

2. The method of claim 1, further comprising:

sending a message to said second port from said first port indicating transmission of said data frame to said second port; and transmitting said data frame to said second fibre channel port.

3. The method of claim 1 further comprising the step of providing an indirect exit port table coupled to said central route table, wherein said indirect exit port table allows multiple ports to use different paths to reach the location associated with said destination information.

4. A method for routing a data frame through a fibre channel fabric, said fabric comprising a first switch having a plurality of ports, said ports are operative for transmitting and receiving said data frame, said method comprising:

providing a central route table coupled to each of said plurality of ports, wherein said step of providing a central route table further comprises providing a first table having one entry for each fibre channel switch in said fibre channel fabric, said first table identifying an offset value and a second table having an entry for every destination identification, said second table for identifying said exit port on said fibre channel exit switch;

receiving a data frame at a first port;

extracting the destination information from said data frame;

transmitting said destination information from said first port to said central route table;

retrieving an association from said central route table, said association comprising an identification of a second port associated with said destination information; and transmitting said association from said central route table to said first port.

5. The method of claim 4, wherein said first table is of sufficient size to accommodate one entry for each fibre channel switch possible in said fabric.

6. The method of claim 4, wherein said second table is of sufficient size to accommodate all ports in said fabric.

7. A method of providing a common route table in a fibre channel switch, said switch having a plurality of ports embodied thereon for transmitting and receiving a data frame, said method comprising:

coupling said common route table to each of said plurality of ports;

receiving a destination identification from a first receive port;

retrieving the identity of a first exit port from said common route table using said destination identification wherein said retrieving further comprises querying a first table for a first index value associated with said identification data and querying a second table, using the first index value, for the identification of the second port associated with said identification data;

sending said identity to said first receive port; and providing a blocking mechanism for blocking transmission of said data frame from said first receive port to a location associated with said destination identification.

8. The method of claim 7 wherein said common route table comprises random access memory.

9. The method of claim 7 wherein said common route table contains associations between a destination identification and a port, said port operating as a transmitting port for said data frame.

10. A fibre channel fabric comprising:

a plurality of switches each having a plurality of ports embodied thereon for transmitting and receiving data frames;

a control route table coupled each of said plurality of fibre channel ports, said control route table operative for providing a single routing table to said plurality of fibre channel ports and for providing association data, said association data comprising the association between a destination identification and a corresponding exit port.

11. The fibre channel fabric of claim 10, further comprising a route control module coupled to one of said ports and said control route table, said route control module for providing an identity of an exit port in response to a request from said port for said exit port, said request comprising a destination identification.

12. The fibre channel fabric of claim 11 further comprising a request exit port bus coupling said fibre channel port to said route control module for transmitting a request exit port bus signal, wherein said request exit port bus operates in a ring structure such that each route control module re-powers said exit port bus signal before transmitting it to the next route control module in said ring structure.

13. The fibre channel switching network of claim 11 further comprising an exit port response bus coupling said fibre channel port to said route control module for transmitting a request exit port response bus signal, wherein said request exit port response bus operates in a ring structure such that each route control module re-powers said exit port response bus signal before transmitting it to the next route control module in said ring structure.

14. The fibre channel switching network of claim 11, further comprising an indirect exit port table coupled to said route control module, wherein said indirect exit port allows for multiple fibre channel ports to use different paths to reach the same location associated with said destination identification.

15. The fibre channel switching network of claim 10, wherein said control route table further comprises:

a first table having one entry for each possible fibre channel switch in said fibre channel switching network, said first table identifying a fibre channel exit switch;

a second table having an entry for every valid destination identification, said second table for identifying said exit port on said fibre channel exit switch.

16. A route control module for generating an identification of a particular exit port based upon a received destination identifier comprising:

a first table which uses a destination identification as the switch identifier to select an offset value;

a second table having an entry for every destination identification, said second table for identifying an exit port based on said offset value; and a route table controller coupled to said first table and said second table, wherein said controller provides said first table with a portion of said destination identification and receives said exit port information from said second table.

17. A fibre channel switch comprising:

a plurality of ports embodied thereon for transmitting and receiving data frames; and a control route table coupled each of said plurality of fibre channel ports, said control route table operative for providing a single routing table to said plurality of fibre channel ports and for providing association data, said association data comprising the association between a destination identification and a corresponding exit port.

* * * * *